(12) United States Patent
Tokura et al.

(10) Patent No.: US 12,276,552 B2
(45) Date of Patent: Apr. 15, 2025

(54) WEARABLE ENVIRONMENTAL SENSOR DEVICE AND MONITORING SYSTEM

(71) Applicant: Nippon Telegraph and Telephone Corporation, Tokyo (JP)

(72) Inventors: Akio Tokura, Tokyo (JP); Kei Kuwabara, Tokyo (JP); Hiroto Matsuoka, Tokyo (JP); Takako Ishihara, Tokyo (JP); Toshiki Wada, Tokyo (JP); Yuichi Higuchi, Tokyo (JP); Yuki Hashimoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 461 days.

(21) Appl. No.: 17/774,420

(22) PCT Filed: Nov. 7, 2019

(86) PCT No.: PCT/JP2019/043644
§ 371 (c)(1),
(2) Date: May 4, 2022

(87) PCT Pub. No.: WO2021/090436
PCT Pub. Date: May 14, 2021

(65) Prior Publication Data
US 2022/0349758 A1    Nov. 3, 2022

(51) Int. Cl.
*G01K 1/08* (2021.01)
*G01K 1/024* (2021.01)
(Continued)

(52) U.S. Cl.
CPC .............. *G01K 1/08* (2013.01); *G01K 1/024* (2013.01); *G01K 7/18* (2013.01); *G01N 27/121* (2013.01);
(Continued)

(58) Field of Classification Search
CPC ............ G01K 1/08; G01K 1/024; G01K 7/18; G01K 2219/00; G01N 27/121; G01N 27/223
See application file for complete search history.

(56) References Cited

U.S. PATENT DOCUMENTS 2,505,451 A  *  4/1950  Weinstock ............. A41D 27/28
                                                     2/87
6,209,144 B1 *  4/2001  Carter .................. A62B 17/006
                                                     2/81
(Continued)

FOREIGN PATENT DOCUMENTS

CA        2310827 A1 *  3/2000
CA        2911077 A1 * 11/2014 ............. A42B 3/046
(Continued)

OTHER PUBLICATIONS

17774420_2024-09-20_CA_2310827_A1_H.pdf,Mar. 23, 2000.*
(Continued)

*Primary Examiner* — Gail Kaplan Verbitsky
(74) *Attorney, Agent, or Firm* — Slater Matsil, LLP

(57) ABSTRACT

A wearable environmental sensor device includes a temperature/humidity sensor disposed on a wall surface of a housing that is exposed to an environment and configured to measure ambient environmental information around a living body, and a protective structure formed around the temperature/humidity sensor. The temperature/humidity sensor is disposed, directly or via a support structure, on or over the wall surface of the housing, wherein the wall surface faces substantially downward from the living body when the wearable environmental sensor device is attached to the living body and the living body is in a standing posture. The protective structure has respective ventilation holes provided in two or more pairs of opposed surfaces thereof each facing in a direction other than a vertical direction of the
(Continued)

living body when the wearable environmental sensor device is attached to the living body and the living body is in the standing posture.

19 Claims, 20 Drawing Sheets

(51) Int. Cl.
  *G01K 7/18* (2006.01)
  *G01N 27/12* (2006.01)
  *G01N 27/22* (2006.01)
(52) U.S. Cl.
  CPC ....... *G01N 27/223* (2013.01); *G01K 2219/00* (2013.01)

(56) References Cited

U.S. PATENT DOCUMENTS

| | | | | |
|---|---|---|---|---|
| 9,214,076 | B2* | 12/2015 | Curtis | G08B 21/02 |
| 2006/0017654 | A1* | 1/2006 | Romo | G06F 3/016 |
| | | | | 345/592 |
| 2006/0252999 | A1* | 11/2006 | Devaul | A61B 5/0024 |
| | | | | 128/920 |
| 2008/0074254 | A1 | 3/2008 | Townsend et al. | |
| 2008/0171915 | A1* | 7/2008 | Kawajiri | A61B 5/14551 |
| | | | | 600/300 |
| 2009/0118595 | A1* | 5/2009 | Greiner | A61B 5/0006 |
| | | | | 600/301 |
| 2010/0198322 | A1* | 8/2010 | Joseph | A61F 7/007 |
| | | | | 607/108 |
| 2017/0156667 | A1* | 6/2017 | Lerner | A61B 5/7282 |
| 2017/0188648 | A1* | 7/2017 | Larrabee | A42B 3/125 |
| 2018/0348863 | A1* | 12/2018 | Aimone | G06F 3/147 |
| 2019/0268550 | A1* | 8/2019 | Arnold | A42B 3/042 |

FOREIGN PATENT DOCUMENTS

| | | | | |
|---|---|---|---|---|
| CN | 204393479 U | * | 6/2015 | |
| CN | 208845436 U | | 5/2019 | |
| EP | 1717648 A2 | * | 11/2006 | G01L 19/16 |
| JP | H04113093 U | | 10/1992 | |
| JP | H0715719 U | | 3/1995 | |
| JP | 2004027417 A | * | 1/2004 | |
| JP | 2006055189 A | | 3/2006 | |
| JP | 2012140737 A | * | 7/2012 | A42B 3/12 |
| JP | 2019086299 A | | 6/2019 | |

OTHER PUBLICATIONS

17774420_2024-09-20_CA_2911077_A1_H.pdf,Nov. 6, 2014.*
17774420_2024-09-20_CN_204393479_U_H.pdf,Jun. 17, 2015.*
17774420_2024-09-20_EP_1717648_A2_H.pdf,Nov. 2, 2006.*
17774420_2024-09-20_JP_2004027417_A_H.pdf,Jan. 29, 2004.*
17774420_2024-09-20_JP_2012140737_A_H.pdf,Jul. 26, 2012.*
17774420_2024-09-23_CN_204393479_U_H.pdf,Jun. 17, 2015.*
Kwon, J. et al., "Evaluation of the Wet Bulb Globe Temperature (WBGT) Index for Digital Fashion Application in Outdoor Environments," JESK, http://dx.doi.org/10.5143/JESK.2017.36.1.23, Dec. 12, 2016, 14 pages.

* cited by examiner

WEARABLE ENVIRONMENTAL SENSOR DEVICE AND MONITORING SYSTEM

CROSS-REFERENCE TO RELATED APPLICATIONS

This patent application is a national phase filing under section 371 of PCT application no. PCT/JP2019/043644, filed on Nov. 7, 2019, which application is hereby incorporated herein by reference.

TECHNICAL FIELD

The present invention relates to a wearable environmental sensor device that measures ambient environmental information around a living body and to a monitoring system.

BACKGROUND

For physical condition management such as heatstroke prevention in hot weather, it is important to monitor environmental information.

For example, a WBGT index meter conventionally used to prevent heatstroke measures a globe temperature, a wet-bulb temperature, and a dry-bulb temperature to determine a WBGT index (see NPL 1). NPL 1 discloses a method that uses the WBGT index as behavior standards based on which outings and exhausting work are avoided when the WBGT index is relatively high.

A conventional WBGT index meter is formed of a relatively large-sized device, and it is difficult to dispose the conventional WBGT index meter at an optionally selected place. For example, the WBGT index published by the Environment Agency is a representative value covering a wide region.

However, a heat stress actually received by an individual person largely depends on a local environment. For example, depending on a place where a person is present such as an outdoor place, an indoor place, a sunny place, a shady place, a lawn-covered place, or a concrete-covered place, the environment greatly differs. In addition, even at the same place, a taller grown-up and a shorter child are affected significantly differently by radiation from the ground. In addition, an environment around a human body greatly varies depending on worn clothes, a state of movement, a state of perspiration, or the like.

Accordingly, a method can be considered in which, to monitor an environment at an intended place, particularly around a human body, a person who intends to manage his or her physical condition carries or wears an environmental sensor and thereby monitors the environment around the human body. However, a conventional typical environmental sensor has problems of inconvenience of portability and limited regions to which the sensor is to be attached. The conventional environmental sensor also has problems in that, when liquid droplets containing sweat or an organic solvent adhere to the sensor, precise measurement can no longer be performed and, when ventilation is interrupted by the attachment of the environmental sensor, original ambient environmental information around the human body can no longer be measured precisely.

CITATION LIST

Non Patent Literature

[NPL1] JuYoun Kwon, Ken Parsons, "Evaluation of the Wet Bulb Globe Temperature (WBGT) Index for Digital Fashion Application in Outdoor Environments", Journal of the Ergonomics Society of Korea, 36(1), pp. 23-36, 2017.

SUMMARY

Technical Problem

Embodiments of the present invention may solve the problems described above, and an object thereof is to allow ambient environmental information around a living body to be easily, stably, and precisely measured.

Means for Solving the Problem

A wearable environmental sensor device of embodiments of the present invention includes: an environmental sensor disposed on a wall surface of a housing which is exposed to an environment and configured to measure ambient environmental information around a living body; and a protective structure formed around the environmental sensor, wherein the environmental sensor is disposed, directly or via a support structure, on or over the wall surface of the housing which is exposed to an environment, wherein the wall surface faces substantially downward from the living body when the wearable environmental sensor device is attached to the living body and the living body is in a standing posture, and the protective structure includes first ventilation holes provided in each of two or more pairs of opposed surfaces thereof, wherein each of the two or more pairs of opposed surfaces faces in a direction other than a vertical direction of the living body when the wearable environmental sensor device is attached to the living body and the living body is in the standing posture.

In an example of a configuration of the wearable environmental sensor device of embodiments of the present invention, the protective structure further includes a second ventilation hole provided in a surface thereof which faces substantially downward from the living body when the wearable environmental sensor device is attached to the living body and the living body is in the standing posture.

In another example of the configuration of the wearable environmental sensor device of embodiments of the present invention, the environmental sensor is formed of any of a temperature sensor, a humidity sensor, an atmospheric pressure sensor, and a gas sensor or a combination thereof.

In still another example of the configuration of the wearable environmental sensor device of embodiments of the present invention, a portion of a surface of the protective structure opposed to the living body and corresponding to a region provided with any of the first ventilation holes has a shape spaced apart from the living body or from wear worn by the living body.

In yet another example of the configuration of the wearable environmental sensor device of embodiments of the present invention, the one of edge sides of each of the first ventilation holes that is most distant from a front end of the protective structure and a sensor surface of the environmental sensor are located on the same plane.

In still another example of the configuration of the wearable environmental sensor device of embodiments of the present invention, a sensor surface of the environmental sensor is more distant from a front end of the protective structure than any position on the one of edge sides of each of the first ventilation holes that is most distant from the front end of the protective structure.

In yet another example of the configuration of the wearable environmental sensor device of embodiments of the present invention, the environmental sensor is disposed on the wall surface of the housing which is exposed to an environment, wherein a normal direction of the wall surface is at an angle in a range satisfying $0°\leq\theta<60°$ from a vertically downward direction when the wearable environmental sensor device is attached to the living body and the living body is in the standing posture.

Still another example of the configuration of the wearable environmental sensor device of embodiments of the present invention further includes: a wireless communication unit configured to wirelessly transmit the environmental information to an external device, and the wireless communication unit is disposed in the sealed housing.

Yet another example of the configuration of the wearable environmental sensor device of embodiments of the present invention further includes: a first connecting element for attaching the wearable environmental sensor device to the living body.

A monitoring system of embodiments of the present invention includes: the wearable environmental sensor device; and wear to be worn by the living body, and the wear includes a second connecting element arranged to be engaged with the first connecting element of the wearable environmental sensor device.

Effects of Embodiments of the Invention

According to embodiments of the present invention, the environmental sensor is disposed, directly or via the support structure, on or over the wall surface of the housing which is exposed to an environment, wherein the wall surface faces substantially downward from the living body when the living body is in the standing posture, and the respective first ventilation holes are provided in the two or more pairs of opposed surfaces of the protective structure each facing in the direction other than the vertical direction of the human body. This allows local ambient environmental information around the living body to be easily and stably measured.

DETAILED DESCRIPTION OF ILLUSTRATIVE EMBODIMENTS

Figure 1A:
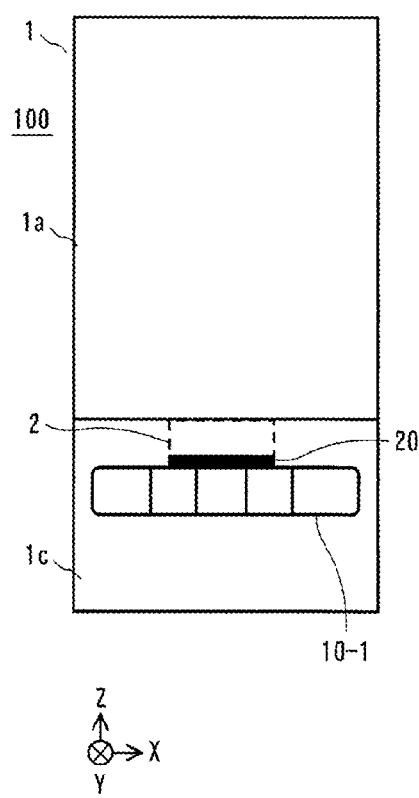
FIG. 1A is a front view of a wearable environmental sensor device according to a first embodiment of the present invention.

Referring to the drawings, a detailed description will be given below of preferred embodiments of the present invention.

First Embodiment

Figure 1B:
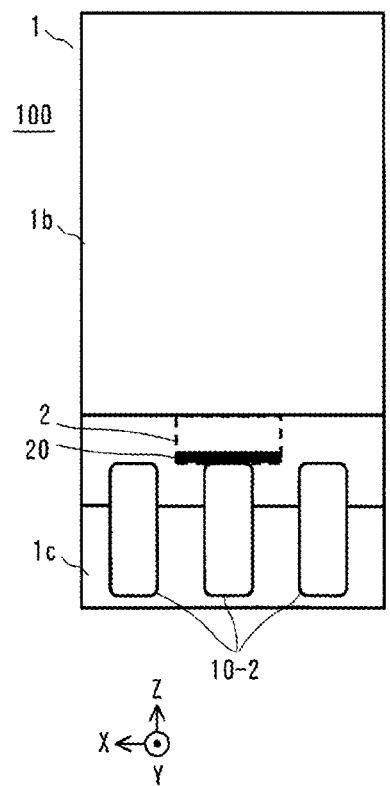
FIG. 1B is a rear view of the wearable environmental sensor device according to the first embodiment of the present invention.
Figure 1C:
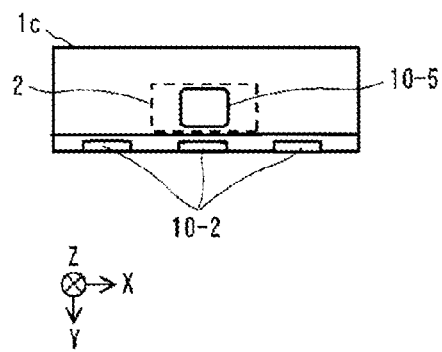
FIG. 1C is a bottom view of the wearable environmental sensor device according to the first embodiment of the present invention.
Figure 2A:
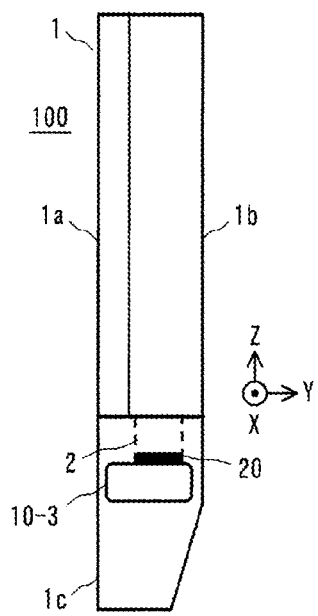
FIG. 2A is a right side view of the wearable environmental sensor device according to the first embodiment of the present invention.
Figure 2B:
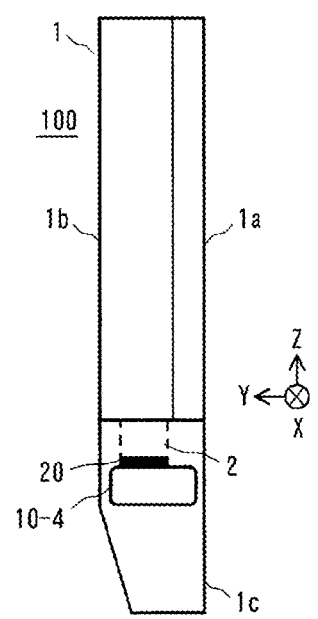
FIG. 2B is a left side view of the wearable environmental sensor device according to the first embodiment of the present invention.

FIG. 1A is a front view of a wearable environmental sensor device according to a first embodiment of the present invention. FIG. 1B is a rear view of the wearable environmental sensor device. FIG. 1C is a bottom view of the wearable environmental sensor device. FIG. 2A is a right side view of the wearable environmental sensor device. FIG. 2B is a left side view of the wearable environmental sensor device. It is assumed herein that a surface of a wearable environmental sensor device 100 opposed to a body surface of a wearer is a rear surface, and an outside-air surface of the wearable environmental sensor device 100 opposite to the rear surface is a front surface thereof. It is also assumed that a left-right direction of the body of the wearer is an X-direction, a front-rear direction thereof is a Y-direction, and a vertical direction thereof is a Z-direction.

The wearable environmental sensor device 100 includes a temperature/humidity sensor 2 (environmental sensor) inside a housing 1. In each of FIGS. 1A, 1B, 2A, and 2B, reference number 20 denotes a sensor surface. The housing 1 includes an upper lid 1a made of a resin and a lower lid 1b similarly made of a resin. To each of the upper lid 1a and the lower lid 1b, a protective structure 1c made of a resin is fixed. As will be described later, an outer wall on a rear side of the housing 1 opposed to inner wear may also include snap buttons for attaching the wearable environmental sensor device 100 to the inner wear.

Figure 3:
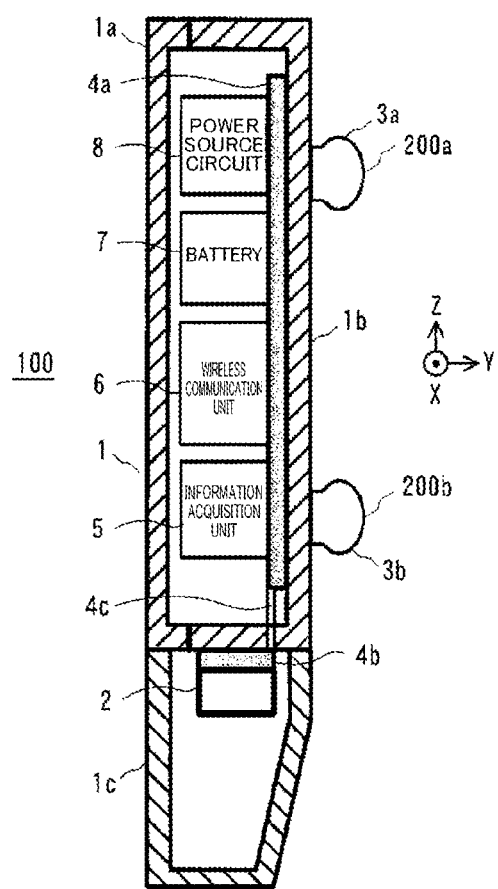
FIG. 3 is a diagram illustrating an inner structure of the wearable environmental sensor device according to the first embodiment of the present invention.

FIG. 3 is a diagram illustrating an inner structure of the wearable environmental sensor device 100. The wearable environmental sensor device 100 includes, between the sealed upper and lower lids 1a and 1b, a rigid substrate 4a and a flexible substrate 4c connecting a circuit mounted on the rigid substrate 4a and the temperature/humidity sensor 2.

On the rigid substrate 4a, an information acquisition unit 5 for processing environmental information measured by the temperature/humidity sensor 2, a wireless communication unit 6 that wirelessly transmits the environmental information to an external device, a battery 7, and a power source circuit 8 that receives a voltage input thereto from the battery 7 and supplies a power source voltage to the circuit on the rigid substrate 4a and to the temperature/humidity sensor 2 are mounted.

The upper lid 1a and the lower lid 1b are sealed to prevent entrance of a liquid such as sweat or rain from the outside and has waterproofness. To ensure waterproofness of the housing, a method of screwing the upper lid 1a to the lower lid 1b in a state where an O-ring is interposed between the upper lid 1a and the lower lid 1a, a method of sticking the upper lid 1a and the lower lid 1b together with an adhesive, a method of ultrasonically joining the upper lid 1a and the lower lid 1b together, or the like may be used appropriately as a known method.

The temperature/humidity sensor 2 is mounted on a rigid substrate 4b. The rigid substrate 4b is fixed to respective outer wall surfaces of the upper lid 1a and the lower lid 1b (wall surface of the housing 1 which is exposed to an environment) facing downward from the wearer when the wearable environmental sensor device 100 is attached to wear worn by the wearer and the wearer is in a standing posture. The temperature/humidity sensor 2 is formed of, e.g., a semiconductor chip. In the semiconductor chip, a temperature sensor having a resistance which varies with a temperature and a humidity sensor having a capacitance and a resistance which vary as a result of absorption of moisture from an ambient gas are provided.

The temperature/humidity sensor 2 mounted on the rigid substrate 4b is electrically connected to the information acquisition unit 5 and the power source circuit 8 inside the upper lid 1a and the lower lid 1b via flexible wiring and wiring on the rigid substrate 4a. As the flexible wiring, e.g., the flexible substrate 4c can be used.

The rigid substrates 4a and 4b and the flexible substrate 4c are integrated with each other to form a rigid/flexible substrate. As described previously, on the rigid substrate 4a, the information acquisition unit 5, the wireless communication unit 6, the battery 7, and the power source circuit 8 are mounted, while the temperature/humidity sensor 2 is mounted on the rigid substrate 4b. The rigid substrate 4a and the rigid substrate 4b are electrically connected by the flexible substrate 4c.

The rigid substrate 4b on which the temperature/humidity sensor 2 is mounted is entirely protected by a chemically inactive film (coating agent) to have a dustproof/waterproof structure. On the sensor surface 20 of the temperature/humidity sensor 2, a waterproof moisture permeable film or the like is provided to allow even the temperature/humidity sensor to have dustproof/waterproof performance.

In a state where the rigid substrates 4a and 4b are fixed to the lower lid 1b, the flexible substrate 4c is vertically interposed between the upper lid 1a and the lower lid 1b, and the upper lid 1a and the lower lid 1b are joined together by a method such as screwing, adhesive sticking, or ultrasonic joining as described above.

As illustrated in FIGS. 1A to 1C, 2A, 2B, and 3, around the temperature/humidity sensor 2, the protective structure is made of, e.g., a resin is disposed. The protective structure is has a function of preventing the temperature/humidity sensor 2 from colliding with an external object and being broken or preventing a human finger or the like from coming into contact with a surface of the temperature/humidity sensor 2 and contaminating the sensor surface. As described above, the protective structure 1c is fixed to the respective outer walls of the upper lid 1a and the lower lid 1b.

The protective structure 1c is provided with ventilation holes that permit air to pass therethrough into the protective structure. The temperature/humidity sensor 2 can come into contact with outside air through the ventilation holes and thereby measure a temperature and a humidity of ambient air, resulting in ensured responsiveness to each of the temperature and the humidity. In the present embodiment, ventilation holes 10-1 and 10-2 (first ventilation holes) are provided in two respective opposed surfaces, i.e., a front surface and a rear surface of the protective structure 1c and ventilation holes 10-3 and 10-4 (first ventilation holes) are formed in two respective opposed surfaces, i.e., a left side surface and a right side surface of the protective structure 1c, while a ventilation hole 10-5 (second ventilation hole) is further provided in a lower surface of the protective structure 1c.

The housing 1 preferably has a light weight and a low thermal conductivity to prevent heat transfer between the temperature/humidity sensor 2 and the housing 1. Accordingly, in a portion of the housing 1 other than those for which metal such as screws, the snap buttons, an electrode, and an antenna needs to be used, the upper lid 1a, the lower lid 1b, and the protective structure 1c are preferably formed of a material such as a synthetic resin.

In the present embodiment, the temperature/humidity sensor 2 having an AD converter embedded therein is used, and measured values of the temperature and the humidity are converted by the AD converter to digital data, which is transmitted to the information acquisition unit 5. A configuration of the temperature/humidity sensor 2 is not limited to that used in the present embodiment, and an analog-output temperature/humidity sensor may also be used.

In the case of using the analog-output temperature/humidity sensor, it is appropriate that an analog signal processing unit and the AD converter are mounted on the rigid substrate 4a, the analog signal processing unit performs processing such as amplification on an analog signal output from the temperature/humidity sensor 2, and then the AD converter converts the processed analog signal to digital data and delivers the digital data to the information acquisition unit 5.

Each of snap buttons 3a and 3b (first connecting element) made of a metal is machined in advance as an individual component. The snap buttons 3a and 3b are integrated with the lower lid 1b by, e.g., an insert molding method such that, when the lower lid 1b made of a resin is produced, projecting portions 200a and 200b project from a lower surface of the outer wall of the lower lid 1b, while the other portion thereof is surrounded by the lower lid 1b. Thus, it is possible to fix the snap buttons 3a and 3b to the lower lid 1b, while ensuring waterproofness of portions of the lower lid 1b to which the snap buttons 3a and 3b are to be fixed.

Figure 4:
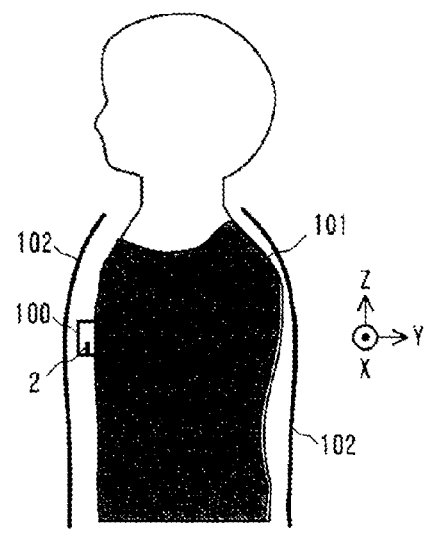
FIG. 4 is a diagram illustrating a state where a wearer wears the wearable environmental sensor device in the first embodiment of the present invention.
Figure 5:
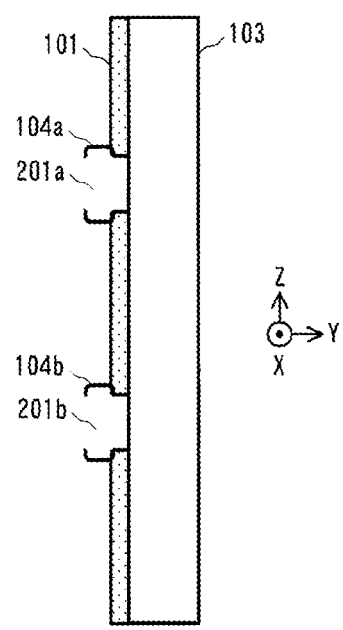
FIG. 5 is an enlarged view of wear in a state where the wearer does not wear the wearable environmental sensor device.
Figure 6:
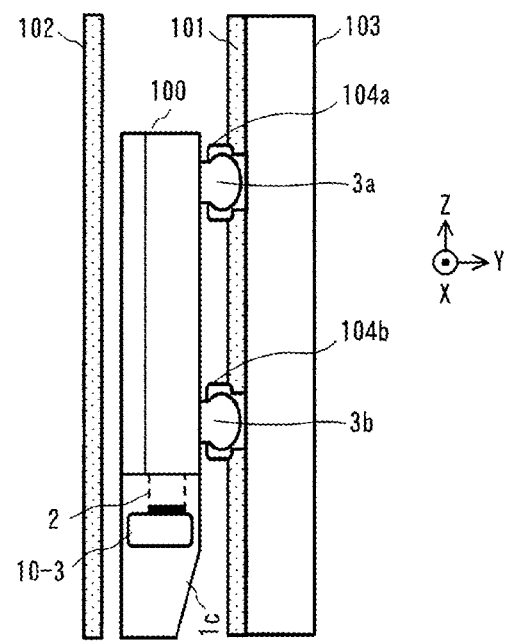
FIG. 6 is an enlarged view of the wearable environmental sensor device and the wear in the state where the wearer wears the wearable environmental sensor device.

FIG. 4 is a diagram illustrating a state where the wearer wears the wearable environmental sensor device 100. FIG. 5 is an enlarged view of the wear in a state where the wearer does not wear the wearable environmental sensor device 100. FIG. 6 is an enlarged view of the wearable environmental sensor device 100 and the wear in the state where the wearer wears the wearable environmental sensor device 100. FIGS. 4 and 6 illustrate a state where the wearer has attached the wearable environmental sensor device 100 to inner wear 101 such as a T-shirt and wears outer wear 102 over the inner wear 101. FIG. 6 illustrates a state where a space between the outer wear 102 and the inner wear 101 is viewed from a right side of a body of the wearer.

A surface of the inner wear 101 opposite to a surface thereof to be brought into contact with skin 103 of the wearer is provided with snap buttons 104a and 104b (second connecting element) that are disposed so as to expose recessed portions 201a and 201b.

As illustrated in FIG. 6, by engaging the projecting portions of the male-type snap buttons 3a and 3b provided in the wearable environmental sensor device 100 with the recessed portions of the female-type snap buttons 104a and 104b provided in the inner wear 101, it is possible to easily attach the wearable environmental sensor device 100 to the inner wear 101. By attaching the wearable environmental sensor device 100 to the inner wear 101, the wearable environmental sensor device 100 and the inner wear 101 form a monitoring system that measures ambient environmental information around the wearer.

The wearable environmental sensor device 100 having a thickness of, e.g., about 5 mm to 10 mm can measure ambient environmental information around the human body, such as a temperature and a humidity, without interrupting an operation of the wearer. In addition, since the snap buttons 3a and 3b are detachable from the snap buttons 104a and 104b, when the inner wear 101 is to be washed, it is possible to detach the wearable environmental sensor device 100 and wash only the inner wear 101.

As illustrated in FIGS. 4 and 6, when the wearer wears the outer wear 102 over the inner wear 101, the wearable environmental sensor device 100 is interposed between the inner wear 101 and the outer wear 102.

Between the inner wear 101 and the outer wear 102, a gap is formed due to bending of the wears 101 and 102 and the thickness of the wearable environmental sensor device 100. As described above, the temperature/humidity sensor 2 is provided on the lower surfaces of the outer walls of the upper lid 1a and the lower lid 1b (lower surface of the wall surface of the housing 1 which is exposed to an environment) of the wearable environmental sensor device 100.

An outer-wall rear surface of the wearable environmental sensor device 100 provided with the snap buttons 3a and 3b and an outer-wall lower surface (the lower surface of the outer wall of the housing 1 which is exposed to an environment) thereof provided with the temperature/humidity sensor 2 are substantially perpendicular to each other. Consequently, when the wearable environmental sensor device 100 is attached to the inner wear 101, the temperature/humidity sensor 2 is disposed on the surface in the vicinity of the body surface of the wearer which is substantially perpendicular to the body surface. As a result, the temperature/humidity sensor 2 faces a space formed between the inner wear 101 and the outer wear 102 to be able to measure environmental information in the space.

Figure 7:
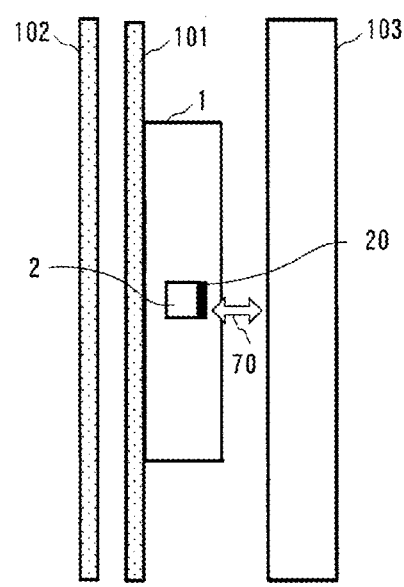
FIG. 7 is an enlarged view of a conventional environmental sensor and wear in a state where the environmental sensor is worn.

As illustrated in FIG. 7, when the temperature/humidity sensor 2 is disposed on the surface of the housing 1 facing the body surface of the wearer when the wearer is in the standing posture, the temperature/humidity sensor 2 has a configuration which allows easy sensing of water vapor generated from the body of the wearer. However, when a situation in which the amount of the generated water vapor increases and liquid droplets (sweat) are generated is encountered, it is highly possible that the liquid droplets of the sweat that have moved along the body of the wearer adhere to the sensor surface 20 of the temperature/humidity sensor 2. In the liquid droplets of the sweat, impurities such as an electrolyte and sebum may have been dissolved and, when such impurities reach the sensor surface 20, measurement accuracy is consequently degraded. In addition, a case where the sweat adheres to the temperature/humidity sensor 2 and a periphery thereof and a humidity tends to be measured higher is likely to occur.

In addition, as indicated by an arrow 70 in FIG. 7, air flows between the skin 103 of the wearer and the sensor surface 20 of the temperature/humidity sensor 2. However, between an external environment (space on a left side of the outer wear 102 in FIG. 7) and the sensor surface 20, ventilation is blocked by the temperature/humidity sensor 2, and therefore the humidity tends to be measured higher.

Figure 8A:
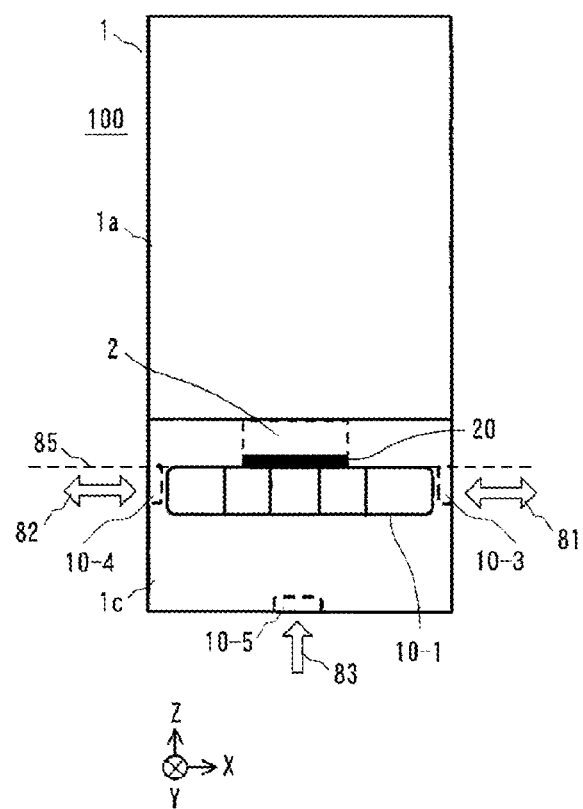
FIG. 8A is a front view illustrating ventilation to a temperature/humidity sensor of the wearable environmental sensor device according to the first embodiment of the present invention.
Figure 8B:
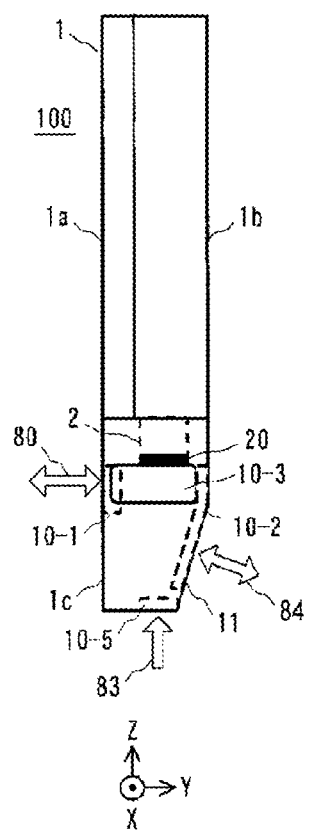
FIG. 8B is a right side view illustrating the ventilation to the temperature/humidity sensor of the wearable environmental sensor device according to the first embodiment of the present invention.

FIG. 8A is a front view illustrating the ventilation to the temperature/humidity sensor 2 of the wearable environmental sensor device 100. FIG. 8B is a right side view illustrating the ventilation to the temperature/humidity sensor 2 of the wearable environmental sensor device 100. As described above, the temperature/humidity sensor 2 is disposed on the surface of the housing 1 facing substantially vertically downward when the wearable environmental sensor device 100 is attached to the inner wear 101 worn by the wearer and the wearer is in the standing posture.

Accordingly, in the present embodiment, a state is reached in which liquid droplets are unlikely to be stably present on the sensor surface 20 of the temperature/humidity sensor 2. As a result, even when liquid droplets of sweat or the like enter an inner space of the protective structure is from the ventilation holes 10-1 to 10-5, it is possible to prevent the liquid droplets from reaching the sensor surface 20 or staying on the sensor surface 20. Therefore, in the present embodiment, it is possible to accurately measure the temperature and the humidity in the wear.

As described previously, in the two opposed surfaces, i.e., the front surface and the rear surface of the protective structure is around the temperature/humidity sensor 2, the ventilation holes 10-1 and 10-2 are provided. As illustrated in FIG. 8A, of respective edge sides of the ventilation holes 10-1 and 10-2, the edge sides (upper edge sides) most distant from a front end of the protective structure 1c and the sensor surface 20 are located on the same plane (plane 85 perpendicular to a paper surface with FIG. 8A), and consequently an air flow passes through a space under the temperature/humidity sensor 2, as indicated by an arrow 80 in FIG. 8B.

Additionally, in the two opposed surfaces, i.e., the left side surface and the right side surface of the protective structure 1c, the ventilation holes 10-3 and 10-4 are provided. Of respective edge sides of the ventilation holes 10-3 and 10-4, the edge sides (upper edge sides) most distant from the front end of the protective structure 1c and the sensor surface 20 are located on the same plane (plane 85 perpendicular to the paper surface with FIG. 8A), and consequently an air flow passes through the space under the temperature/humidity sensor 2, as indicated by arrows 81 and 82 in FIG. 8A.

The air between the inner wear 101 and the outer wear 102 communicates with the outside air through a lower opening and an upper opening of the outer wear 102. Between the inner wear 101 and the outer wear 102, an air flow is generated mainly in the vertical direction to cause ventilation. Since the lower surface of the protective structure 1c is provided with the ventilation hole 10-5, as indicated by an arrow 83 in FIGS. 8A and 8B, the air flow is delivered to the sensor surface 20.

As indicated by a surface 11 surrounded by a broken line in FIG. 8B, the protective structure 1c has a structure in which a wearer-side rear surface is inclined so as to downwardly go further away from the body surface of the wearer. Accordingly, even though the wearable environmental sensor device 100 is in intimate contact with the inner wear 101, around the surface 11, a space is formed between the wearable environmental sensor device 100 and the inner wear, and an air flow is generated as indicated by an arrow 84 in FIG. 8B.

As described above, by using the wearable environmental sensor device 100 in the present embodiment, unlike in a case where a conventionally typical environmental sensor is attached, it is possible to solve the problem of degraded ventilation around the temperature/humidity sensor 2 and also solve the problem of degraded performance of the temperature/humidity sensor 2 caused by sweat or the like reaching the temperature/humidity sensor 2. Therefore, the wearable environmental sensor device 100 can measure actual environmental information in wear.

Second Embodiment

Figure 9A:
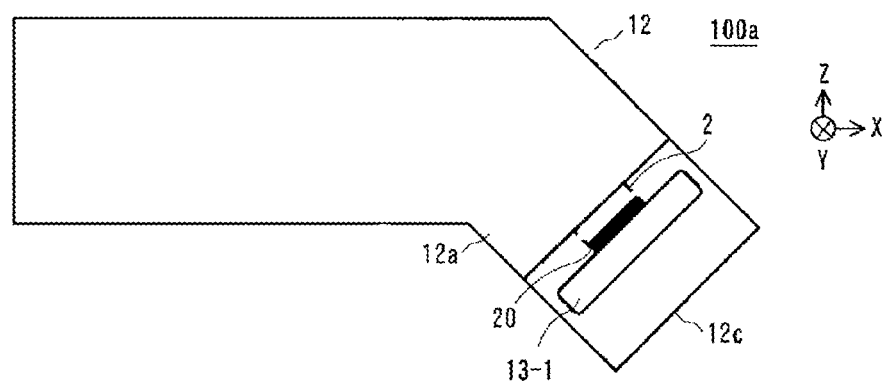
FIG. 9A is a front view of a wearable environmental sensor device according to a second embodiment of the present invention.
Figure 9B:
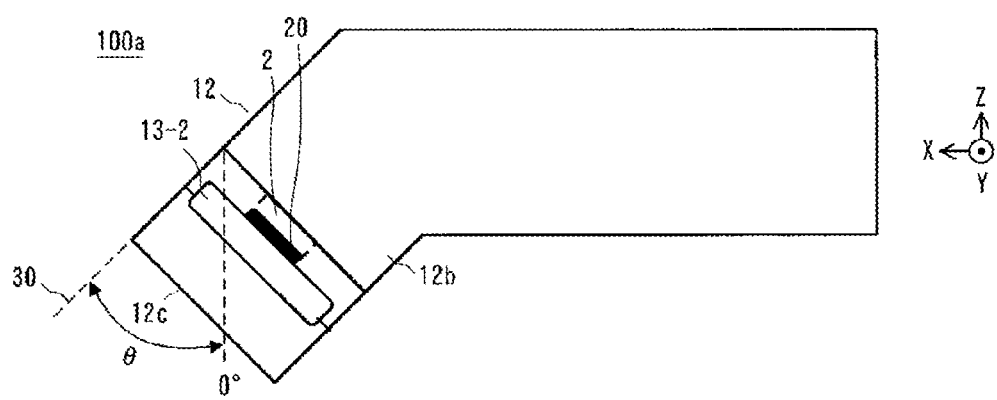
FIG. 9B is a rear view of the wearable environmental sensor device according to the second embodiment of the present invention.
Figure 10A:
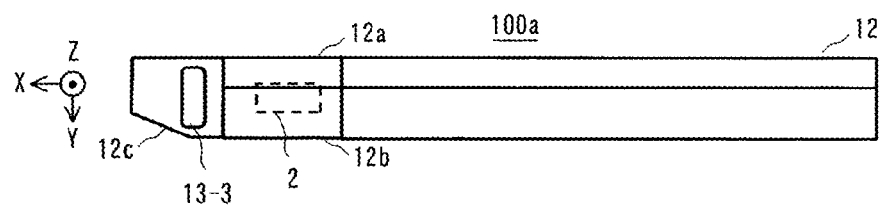
FIG. 10A is a top view of the wearable environmental sensor device according to the second embodiment of the present invention.
Figure 10B:
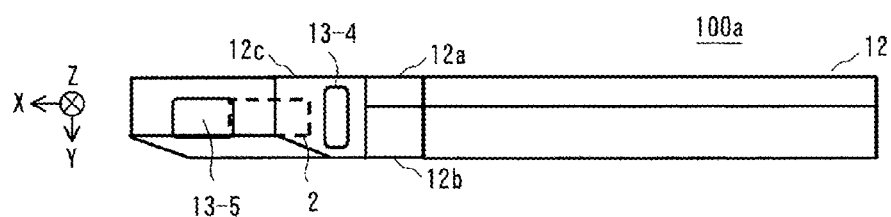
FIG. 10B is a bottom view of the wearable environmental sensor device according to the second embodiment of the present invention.

Next, a description will be given of a second embodiment of the present invention. FIG. 9A is a front view of a wearable environmental sensor device according to the second embodiment of the present invention. FIG. 9B is a rear view of the wearable environmental sensor device. FIG. 10A is a top view of the wearable environmental sensor device. FIG. 10B is a bottom view of the wearable environmental sensor device.

A circuit configuration of a wearable environmental sensor device 100a is the same as that of the wearable environmental sensor device 100 in the first embodiment. In the present embodiment, the temperature/humidity sensor 2 is disposed on a surface of a housing 12 facing obliquely downward from a body of a wearer when the wearable environmental sensor device 100a is attached to wear worn by the wearer and the wearer is in a standing posture.

In the present embodiment, such disposition can more significantly reduce a possibility that sweat adheres to the temperature/humidity sensor 2 and the periphery thereof than in such a case as in the first embodiment where the temperature/humidity sensor 2 is disposed on the surface of the housing 1 facing vertically downward. Additionally, in the present embodiment, it is also possible to avoid a situation in which an air flow around the temperature/humidity sensor 2 is blocked to stagnate as in a case where the temperature/humidity sensor 2 is disposed on the surface of the housing 1 facing vertically downward when the wearer is in the standing posture.

To prevent each of the adherence of the sweat to the temperature/humidity sensor 2 and the stagnation of the air flow, it is appropriate to use, as a surface of the housing 12 on which the temperature/humidity sensor 2 is disposed when the wearable environmental sensor device 100a is attached to the wear worn by the wearer and the wearer is in the standing posture, a surface of the housing 12 a normal 30 to which is at an angle θ in a range satisfying, e.g., 0°≤θ<60° based on a vertically downward direction (0°).

Figure 11:
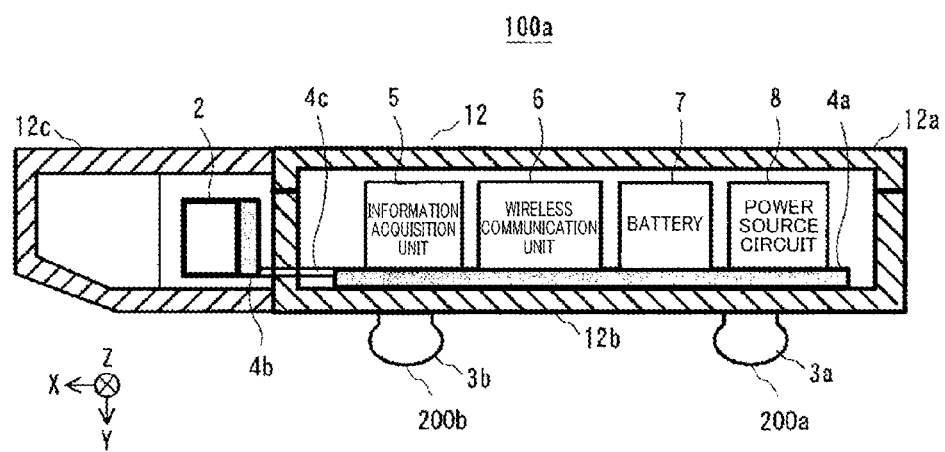
FIG. 11 is a diagram illustrating an inner structure of the wearable environmental sensor device according to the second embodiment of the present invention.

FIG. 11 is a diagram illustrating an inner structure of the wearable environmental sensor device 100a. The housing 12 includes an upper lid 12a made of a resin and a lower lid 12b, similarly made of a resin. To each of the upper lid 12a and the lower lid 12b, a protective structure 12c made of a resin is fixed.

The snap buttons 3a and 3b, the rigid substrates 4a and 4b, the flexible substrate 4c, the information acquisition unit 5, the wireless communication unit 6, the battery 7, and the power source circuit 8 are as described in the first embodiment. A method of sealing the upper lid 12a and the lower lid 12b and a method of attaching the wearable environmental sensor device 100a to inner wear are also as described in the first embodiment.

In the same manner as in the first embodiment, the temperature/humidity sensor 2 is mounted on the rigid substrate 4b. The rigid substrate 4b is fixed to respective outer wall surfaces of the upper lid 12a and the lower lid 12b (wall surface of the housing 12 which is exposed to an environment) facing obliquely downward from the body of the wearer when the wearable environmental sensor device 100a is attached to the wear worn by the wearer and the wearer is in the standing posture. The protective structure 12c is fixed to these outer wall surfaces (wall surface of the housing 12 which is exposed to an environment).

The protective structure 12c is provided with ventilation holes. In the present embodiment, ventilation holes 13-1 and 13-2 (first ventilation holes) are provided in two respective opposed surfaces, i.e., a front surface and a rear surface of the protective structure 12c and ventilation holes 13-3 and 13-4 (first ventilation holes) are formed in two respective opposed surfaces, i.e., a left side surface and a right side surface of the protective structure 12c, while a ventilation hole 13-5 (second ventilation hole) is further provided in a lower surface of the protective structure 12c.

Figure 12A:
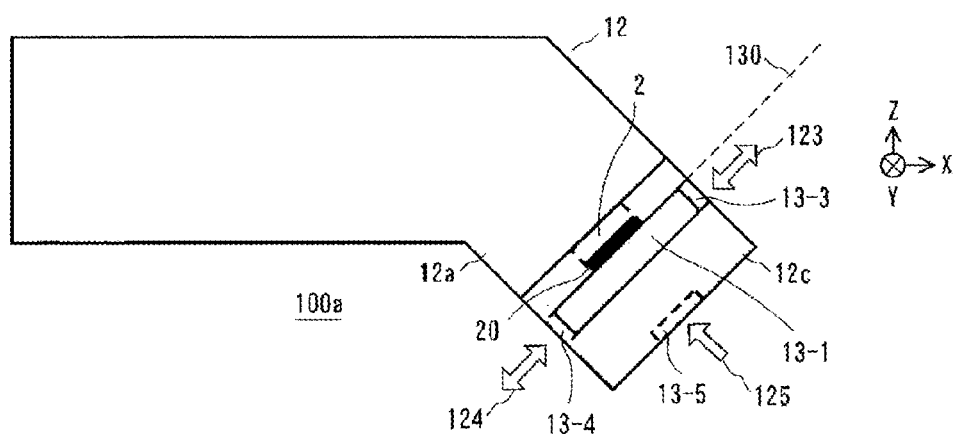
FIG. 12A is a front view illustrating ventilation to a temperature/humidity sensor of the wearable environmental sensor device according to the second embodiment of the present invention.
Figure 12B:
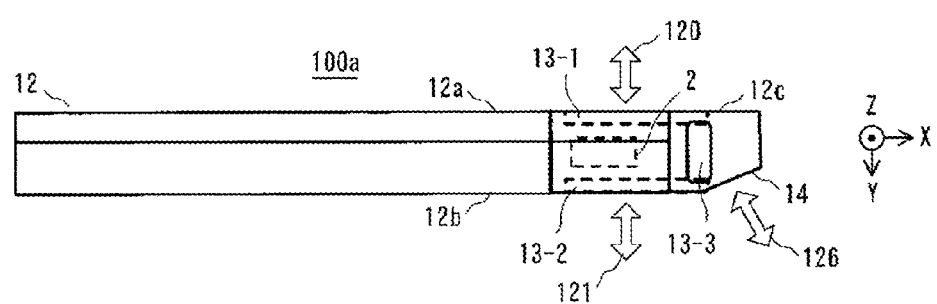
FIG. 12B is a top view illustrating the ventilation to the temperature/humidity sensor of the wearable environmental sensor device according to the second embodiment of the present invention.

FIG. 12A is a front view illustrating ventilation to the temperature/humidity sensor 2 of the wearable environmental sensor device 100*a*. FIG. 12B is a top view illustrating the ventilation to the temperature/humidity sensor 2 of the wearable environmental sensor device 100*a*.

In the two opposed surfaces, i.e., the front surface and the rear surface of the protective structure 12*c* around the temperature/humidity sensor 2, the ventilation holes 13-1 and 13-2 are provided. As illustrated in FIG. 12A, of respective edge sides of the ventilation holes 13-1 and 13-2, the edge sides most distant from a front end of the protective structure 12*c* and the sensor surface 20 are located on the same plane (plane 130 perpendicular to a paper surface with FIG. 12A), and consequently an air flow passes through a space under the temperature/humidity sensor 2, as indicated by arrows 120 and 121 in FIG. 12B.

Additionally, in the two opposed surfaces, i.e., the left side surface and the right side surface of the protective structure 12*c*, the ventilation holes 13-3 and 13-4 are provided. As illustrated in FIG. 12A, of respective edge sides of the ventilation holes 13-3 and 13-4, the edge sides most distant from the front end of the protective structure 12*c* and the sensor surface 20 are located on the same plane (plane 130 perpendicular to the paper surface with FIG. 12A), and consequently an air flow passes through the space under the temperature/humidity sensor 2, as indicated by arrows 123 and 124 in FIG. 12A. In addition, the lower surface of the protective structure 12*c* is provided with the ventilation hole 13-5, and consequently an air flow is delivered to the sensor surface 20, as indicated by an arrow 125 in FIG. 12A.

Still additionally, as indicated by a surface 14 in FIG. 12B, the protective structure 12*c* has a structure in which a wearer-side rear surface is inclined so as to downwardly go further away from a body surface of the wearer. Accordingly, even when the wearable environmental sensor device 100*a* is in contact with the inner wear, around the surface 14, a space is formed between the wearable environmental sensor device 100*a* and the inner wear, and an air flow is generated as indicated by an arrow 126 in FIG. 12B.

Figure 13:
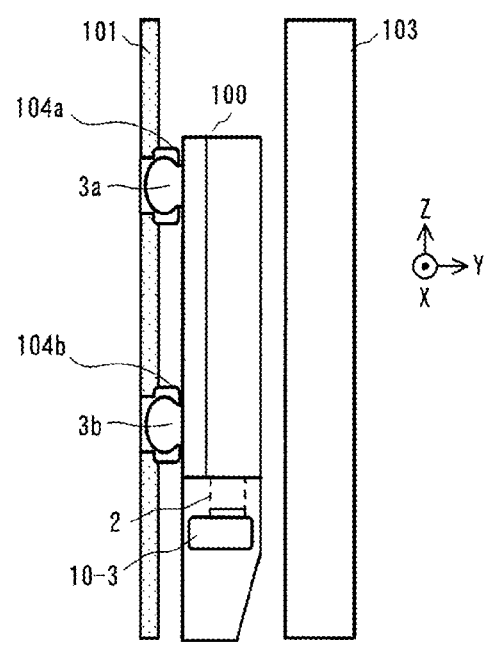
FIG. 13 is an enlarged view of the wearable environmental sensor device and wear in a state where a wearer wears the wearable environmental sensor device.

Note that, in the first and second embodiments, each of the wearable environmental sensor devices 100 and bow is attached to the surface of the inner wear opposite to the surface thereof opposed to the body surface of the wearer. However, each of the wearable environmental sensor devices 100 and 100*a* may also be attached to the surface of the inner wear opposed to the body surface of the wearer. In other words, each of the wearable environmental sensor devices 100 and 100*a* may also be disposed between the inner wear and the body surface of the wearer. FIG. 13 illustrates a state in which the wearable environmental sensor device is attached in this case.

Third Embodiment

Figure 14A:
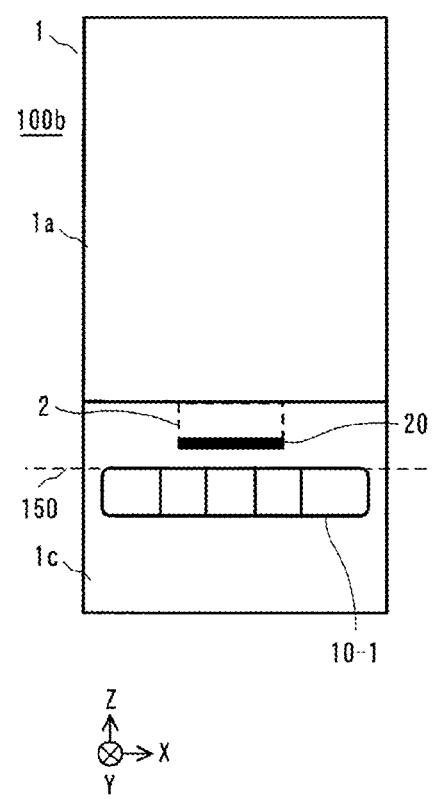
FIG. 14A is a front view of a wearable environmental sensor device according to a third embodiment of the present invention.
Figure 14B:
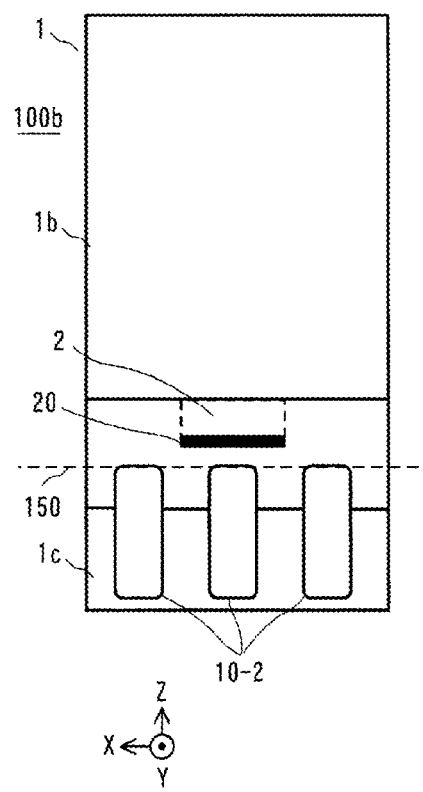
FIG. 14B is a rear view of the wearable environmental sensor device according to the third embodiment of the present invention.
Figure 14C:
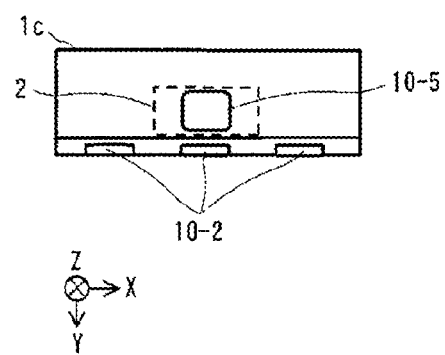
FIG. 14C is a bottom view of the wearable environmental sensor device according to the third embodiment of the present invention.
Figure 15A:
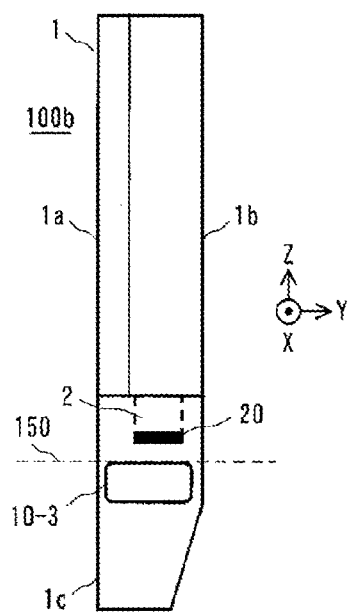
FIG. 15A is a right side view of the wearable environmental sensor device according to the third embodiment of the present invention.
Figure 15B:
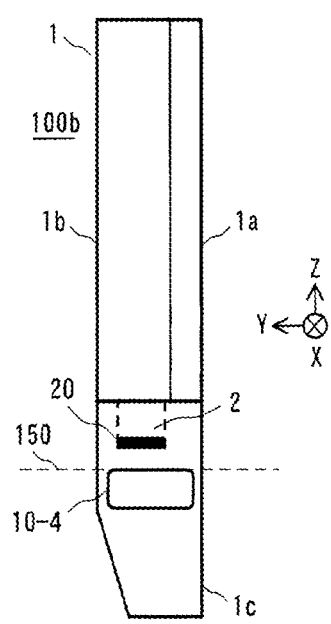
FIG. 15B is a left side view of the wearable environmental sensor device according to the third embodiment of the present invention.

Next, a description will be given of a third embodiment of the present invention. FIG. 14A is a front view of a wearable environmental sensor device according to a third embodiment of the present invention. FIG. 14B is a rear view of the wearable environmental sensor device. FIG. 14C is a bottom view of the wearable environmental sensor device. FIG. 15A is a right side view of the wearable environmental sensor device. FIG. 15B is a left side view of the wearable environmental sensor device.

In the first embodiment, of the respective edge sides of the ventilation holes 10-1 to 10-4 of the protective structure 1*c*, the edge sides (upper edge sides) most distant from the front end of the protective structure 1*c* and the sensor surface 20 are located on the same plane (plane 85 perpendicular to the paper surface with FIG. 8A).

By contrast, in a wearable environmental sensor device 100*b* in the present embodiment, of the respective edge sides of the ventilation holes 10-1 to 10-4 of the protective structure 1*c*, the edge sides (upper edge sides) most distant from the front end of the protective structure 1*c* and the sensor surface 20 are located in parallel to each other, but the upper edge sides of the ventilation holes 10-1 to 10-4 and the sensor surface 20 are located on different planes. In the example in FIGS. 14A, 14B, 15A, and 15B, the respective upper edge sides of the ventilation holes 10-1 to 10-4 are located on a plane 150 different from that of the sensor surface 20.

The sensor surface 20 of the temperature/humidity sensor 2 is more distant from the front end of the protective structure 1*c* than any position on those of the respective edge sides of the first ventilation holes which are most distant from the front end of the protective structure 1*c*. In other words, when the wearable environmental sensor device 100*b* is attached to wear worn by a wearer and the wearer is in a standing posture, the sensor surface 20 is located above the respective upper edge sides of the ventilation holes 10-1 to 10-4. A vertical distance between the sensor surface 20 and each of the respective upper edge sides of the ventilation holes 10-1 to 10-4 is, e.g., 1 mm.

In the present embodiment, a structure is used in which, even when liquid droplets of sweat or the like enter the inner space of the protective structure 1*c* from the ventilation holes 10-1 to 10-5, a possibility that the liquid droplets adhere to the sensor surface 20 is extremely low. Accordingly, even when the wearable environmental sensor device 100*b* is disposed between the inner wear and the body surface of the wearer, the possibility that the liquid droplets of sweat or the like adhere to the sensor surface 20 is low, and reliable measurement is possible.

The configuration is otherwise the same as described in the first embodiment. It goes without saying that the present embodiment may also be applied to the second embodiment.

In each of the first to third embodiments, the example is shown in which, as the means for connecting the wearable environmental sensor device 100, 100*a*, or 100*b* and the wear, the snap buttons are used. However, the connection means is not limited thereto, and a connection means such as, e.g., magnets, clips, magic tapes (registered trademark), or the like may also be used. Using such a connection means, each of the wearable environmental sensor devices 100, 100*a*, and 100*b* can be attached to the wear.

Alternatively, it may also be possible to provide the wear with a pocket or the like without providing any of the wearable environmental sensor devices 100, 100*a*, and 100*b* with a connection means and allow each of the wearable environmental sensor devices 100, 100*a*, and 100*b* to be attached to the wear. However, when the wearable environmental sensor device 100, 100*a*, or 100*b* is put in the pocket, responsiveness of temperature/humidity measurement may deteriorate. Accordingly, to enhance the responsiveness of the temperature/humidity measurement, it is desirable to use a material having a high moisture permeability such as mesh fabric as a material of the pocket.

Additionally, each of the wearable environmental sensor devices 100, 100*a*, and 100*b* may also be attached not only to a front side (such as a chest region or an abdominal region), but also to a back side (such as a back or a neck region) or to a lateral side (such as a shoulder or an arm).

Still additionally, each of the wearable environmental sensor devices 100, 100*a*, and 100*b* that monitors the ambient environmental information around a living body as a monitoring target may also be attached not only to a person, but also to an animal or the like.

Figure 16:
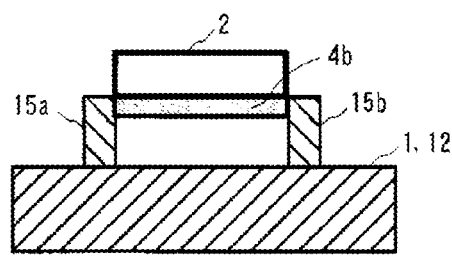
FIG. 16 is a diagram illustrating another method of fixing each of the temperature/humidity sensors according to the first to third embodiments of the present invention.
Figure 17:
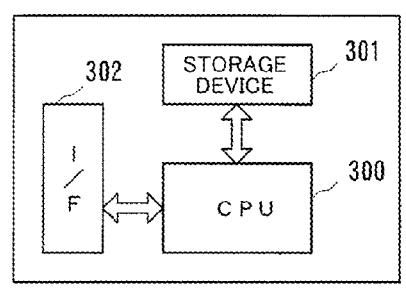
FIG. 17 is a block diagram illustrating an example of a configuration of a computer that implements each of the wearable environmental sensor devices according to the first to third embodiments of the present invention.

In each of the first to third embodiments, the temperature/humidity sensor 2 is mounted on the rigid substrate 4*b*, and the rigid substrate 4*b* is fixed directly to the outer wall surface of the housing 1 or 12 (wall surface of the housing 1 or 12 which is exposed to an environment), but a manner in which the temperature/humidity sensor 2 is disposed is not limited thereto. As illustrated in FIG. 16, the temperature/humidity sensor 2 may also be disposed (placed) via a support structure to be spaced apart from the outer wall surface of the housing 1 or 12 (wall surface of the housing 1 or 12 which is exposed to an environment) except for a supported portion thereof such that the sensor surface 20 of the temperature/humidity sensor 2 is in parallel to the outer wall surface (wall surface of the housing 1 or 12 which is exposed to an environment).

Specifically, a support structure 15*a* or 15*b* supporting the rigid substrate 4*b* having the temperature/humidity sensor 2 mounted thereon may be provided appropriately on the outer wall surface of the housing 1 or 12 (wall surface of the housing 1 or 12 which is exposed to an environment) such that the rigid substrate 4*b* is disposed over the outer wall surface of the housing 1 or 12 (wall surface of the housing 1 or 12 which is exposed to an environment) to be spaced apart therefrom. Thus, each of the support structures 15*a* and 15*b* allows the temperature/humidity sensor 2 to be disposed to be spaced apart from the outer wall surface (wall surface of the housing 1 or 12 which is exposed to an environment) except for the supported portion thereof.

In each of the first to third embodiments, the respective ventilation holes are provided in the pair of opposed surfaces, e.g., the front and rear surfaces facing in the front-rear direction of the wearer and in the pair of opposed surfaces, i.e., the left and right side surfaces facing in the left-right direction of the wearer when the wearable environmental sensor device 100, 100*a*, or 100*b* is attached to the wear worn by the wearer and the wearer is in the standing posture. However, the places where the ventilation holes are provided are not limited thereto. When each of the protective structures 1*c* and 12*c* has a polyhedral shape having three or more pairs of opposed surfaces facing in the left-right direction or the front-rear direction of the wearer, the respective ventilation holes may also be provided in these three or more opposed surfaces.

Each of the first to third embodiments has shown the example in which the temperature/humidity sensor is used as the environmental sensor. However, the environmental sensor is not limited thereto, and any of a temperature sensor, a humidity sensor, an atmospheric pressure sensor, and a gas sensor may be used as the environmental sensor or an optional combination of the temperature sensor, humidity sensor, atmospheric pressure sensor, and gas sensor may also be used as the environmental sensor. A measurement method of the sensor is not also particularly limited, and the temperature sensor may be, e.g., a thermistor, a thermocouple, or the like.

Of each of the configurations of the wearable environmental sensor devices 100, 100*a*, and 100*b* described in the first to third embodiments, functions of software of the information acquisition unit 5 and the wireless communication unit 6 can be implemented by a computer including a CPU (Central Processing Unit), a storage device, and an interface and by a program that controls these hardware resources. FIG. 9 illustrates an example of a configuration of the computer.

The computer includes a CPU 300, a storage device 301, and an interface device (I/F) 302. To the interface device 302, hardware of the temperature/humidity sensor 2 and the wireless communication unit 6 or the like is connected. In such a computer, a program for implementing a monitoring method of the present invention is stored in a storage device 301. A CPU 300 performs processing described in the first to third embodiments based on the program stored in the storage device 301.

INDUSTRIAL APPLICABILITY

Embodiments of the present invention are applicable to technology of measuring environmental information.

REFERENCE SIGNS LIST

1, 12 Housing
1*a*, 12*a* Upper lid
1*b*, 12*b* Lower lid
1*c*, 12*c* Protective structure
2 Temperature/humidity sensor
3*a*, 3*b*, 104*a*, 104*b* Snap button
4*a*, 4*b* Rigid substrate
4*c* Flexible substrate
5 Information acquisition unit
6 Wireless communication unit
7 Battery
8 Power source circuit
10-1 to 10-5, 13-1 to 13-5 Ventilation hole
15*a*, 15*b* Support structure
100, 100*a*, 100*b* Wearable environmental sensor device
101 Inner wear
102 Outer wear

The invention claimed is:
1. A wearable environmental sensor device, the device comprising:
 a housing comprising a wall exposed to an environment;
 an environmental sensor disposed on the wall and configured to measure ambient environmental information around a living body; and
 a protective structure disposed around the environmental sensor, the protective structure comprising first ventilation holes provided in each of two or more pairs of opposed surfaces of the protective structure, wherein, when the wearable environmental sensor device is attached to the living body and the living body is in a standing posture, each of the two or more pairs of opposed surfaces faces in a direction other than a vertical direction of the living body and the wall faces substantially downward from the living body, the two or more pairs of opposed surfaces include a first surface facing the living body, and a second surface facing the first surface, and the first surface with the first ventilation hole is inclined so as to downwardly go further away from the living body.
2. The device according to claim 1, wherein the protective structure further comprises a second ventilation hole provided in a surface of the protective structure that faces substantially downward from the living body when the wearable environmental sensor device is attached to the living body and the living body is in the standing posture.

3. The device according to claim 1, wherein the environmental sensor comprises a temperature sensor, a humidity sensor, an atmospheric pressure sensor, or a gas sensor.

4. The device according to claim 1, wherein a portion of a surface of the protective structure opposed to the living body and corresponding to a region provided with any of the first ventilation holes is spaced apart from the living body.

5. The device according to claim 1, wherein a portion of a surface of the protective structure opposed to the living body and corresponding to a region provided with any of the first ventilation holes is spaced apart from wear worn by the living body.

6. The device according to claim 1, wherein a normal direction of the wall on which the environmental sensor is disposed is at an angle in a range satisfying $0° \leq \theta < 60°$ from a vertically downward direction when the wearable environmental sensor device is attached to the living body and the living body is in the standing posture.

7. The device according to claim 1, wherein the housing is sealed.

8. The device according to claim 7, further comprising a wireless communication device disposed in the housing and configured to wirelessly transmit the environmental information to an external device.

9. The device according to claim 1, further comprising a connecting element configured to attach the wearable environmental sensor device to the living body.

10. The device according to claim 1, wherein the environmental sensor is disposed over the wall of the housing via a support structure.

11. A monitoring system comprising:
the wearable environmental sensor device according to claim 1; and
a first connecting element configured to attach the wearable environmental sensor device to the living body; and
wear configured to be worn by the living body, the wear comprising a second connecting element arranged to be engaged with the first connecting element of the wearable environmental sensor device.

12. The device according to claim 1, wherein the protective structure is formed to surround the environmental sensor.

13. The device according to claim 1, wherein the environmental sensor is disposed between the first surface and the second surface of the protective structure.

14. A wearable environmental sensor device, the device comprising:
a housing comprising a wall exposed to an environment;
an environmental sensor disposed on the wall and configured to measure ambient environmental information around a living body; and
a protective structure disposed around the environmental sensor, the protective structure comprising first ventilation holes provided in each of two or more pairs of opposed surfaces of the protective structure, wherein, when the wearable environmental sensor device is attached to the living body and the living body is in a standing posture, each of the two or more pairs of opposed surfaces faces in a direction other than a vertical direction of the living body and the wall faces substantially downward from the living body, the two or more pairs of opposed surfaces include a first surface facing the living body, and a second surface facing the first surface, and the first surface with the first ventilation hole is inclined so as to downwardly go further away from the living body, wherein one of edge sides of each of the first ventilation holes that is most distant from a front end of the protective structure and a sensor surface of the environmental sensor are located on the same plane.

15. A monitoring system comprising:
the wearable environmental sensor device according to claim 14;
a first connecting element configured to attach the wearable environmental sensor device to the living body; and
wear configured to be worn by the living body, the wear comprising a second connecting element arranged to be engaged with the first connecting element of the wearable environmental sensor device.

16. The device according to claim 14, wherein the protective structure is formed to surround the environmental sensor.

17. The device according to claim 14, wherein the environmental sensor is disposed between the first surface and the second surface of the protective structure.

18. A wearable environmental sensor device, the device comprising:
a housing comprising a wall exposed to an environment;
an environmental sensor disposed on the wall and configured to measure ambient environmental information around a living body; and
a protective structure disposed around the environmental sensor, the protective structure comprising first ventilation holes provided in each of two or more pairs of opposed surfaces of the protective structure, wherein, when the wearable environmental sensor device is attached to the living body and the living body is in a standing posture, each of the two or more pairs of opposed surfaces faces in a direction other than a vertical direction of the living body and the wall faces substantially downward from the living body, wherein a sensor surface of the environmental sensor is more distant from a front end of the protective structure than any position on one of edge sides of each of the first ventilation holes that is most distant from the front end of the protective structure.

19. A monitoring system comprising:
the wearable environmental sensor device according to claim 18;
a first connecting element configured to attach the wearable environmental sensor device to the living body; and
wear configured to be worn by the living body, the wear comprising a second connecting element arranged to be engaged with the first connecting element of the wearable environmental sensor device.

* * * * *